Patented July 1, 1941

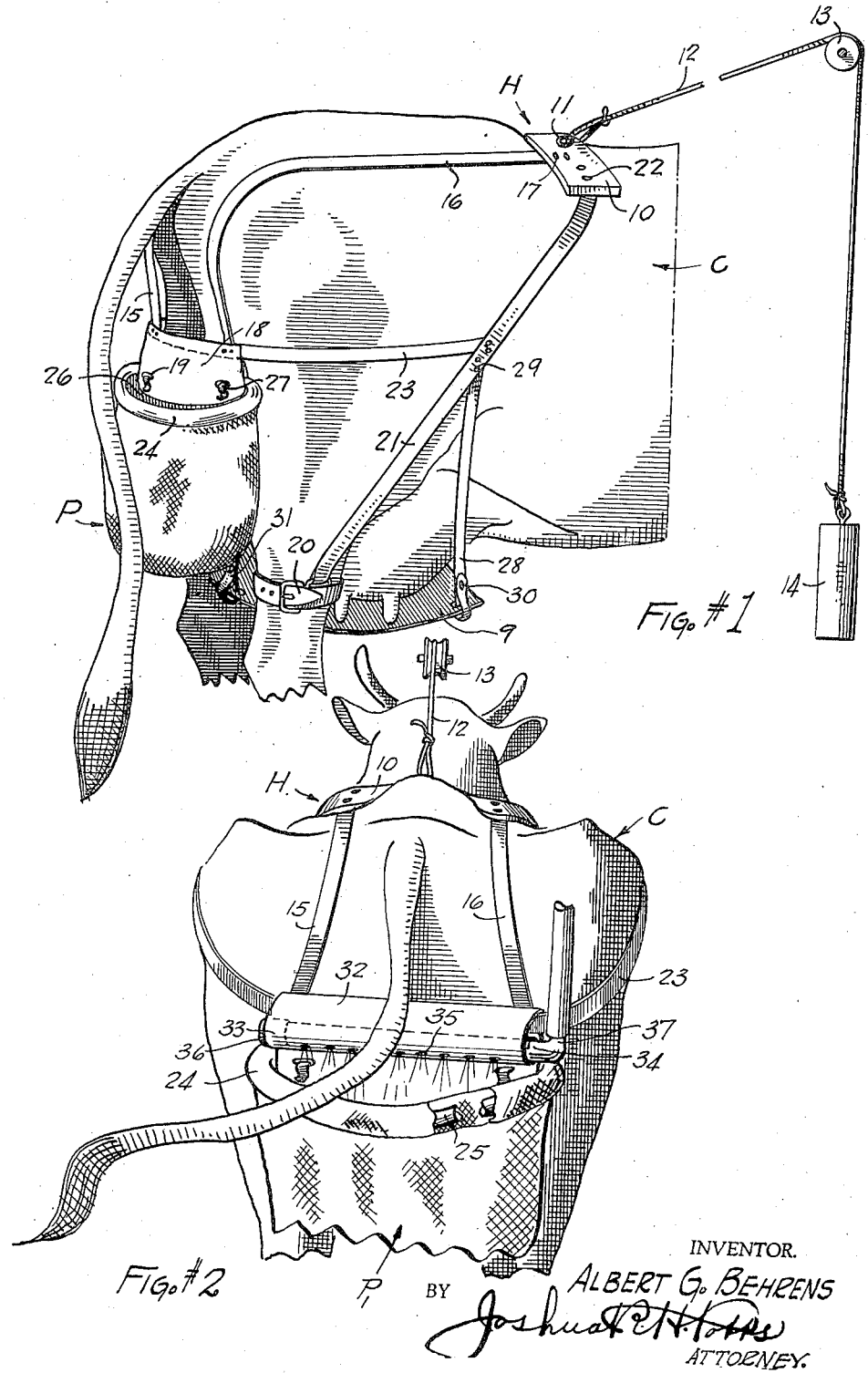

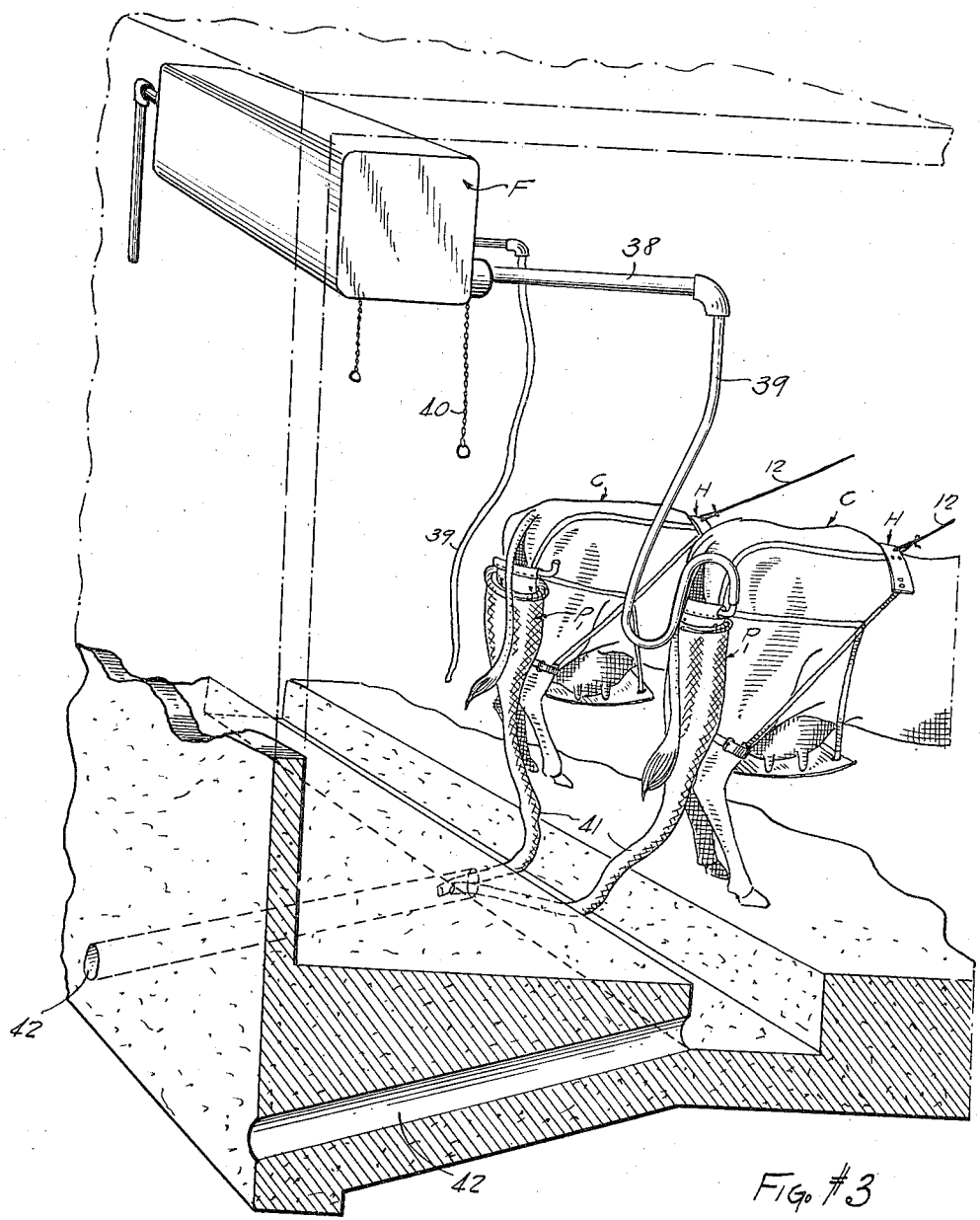

2,247,431

UNITED STATES PATENT OFFICE 2,247,431

SANITARY ATTACHMENT FOR DAIRY COWS

Albert G. Behrens, Camden, N. J.

Application November 30, 1940, Serial No. 367,985

9 Claims. (Cl. 119—95)

This invention has to do with dairy cows, and is concerned primarily with the provision of a sanitary device intended to be attached to a cow for receiving the natural excrement of the cow.

At the present time milk is recognized as one of the most important, if not the most important food of man. It is also equally recognized that milk must be safeguarded to keep it in as pure a condition as possible. Because of this need various efforts have been expended to the end of keeping the milking operations away from the cow's excrement. The trend of such development work has been to provide the improvement in the construction of the dairy stable, and it is probably true that the utmost of perfection in this direction has been attained.

However, in the most modern of dairy stables the cows are free to pass their excrement at any time during milking operations, and thus seriously endanger the purity of the milk. While the modern dairy stable is so designed that the major portion of the cow's droppings are received in a trough designed for such reception, some portion of the droppings often fall on the floor of the stalls themselves. When the cows lie down in the stalls in such an unclean state their flanks become soiled, and this condition, coupled with the natural swishing of the tails, gives rise to a generally unsatisfactory and unhealthy condition.

With the foregoing conditions in mind this invention has in view, as its foremost objective, the provision of a sanitary device which is intended to be attached to a dairy cow during those periods in which it is in the dairy stable. This device is intended to receive the excrement from the cow, and thus eliminate all unclean and unhealthy conditions which might be created by the passing of the excrement in the stables.

More in detail this invention has in view, as an object, the provision of a harness which is intended to be applied over the rear portion of a cow, and to which harness is detachably secured a pouch for receiving the cow's excrement. With the harness more or less permanently attached to a cow it is possible and entirely practical to remove filled or soiled pouches and attach a clean one as occasion demands.

While it may be possible in some instances to attain sufficient support for the harness and attached pouch from the cow itself, the invention has in mind, as a further object, the provision of means by which supplemental support is obtained extraneously of the cow.

More in detail this invention has, as an object, the provision of a harness of the character above noted which is designed to be applied over the rear portion of a cow, and to which is attached extraneous supporting means. This supporting means preferably is of a type which permits of movement of the cow into a lying down position. This end is achieved by passing a line over a pulley at the front end of the cow's stall. One end of this line is anchored to the harness, while the other end is weighted sufficiently to provide the required support.

Various other detailed objects and advantages of the invention are associated with the particular construction of the pouch and the manner in which it is attached to the harness.

Yet another object of the invention is the provision of a sanitary device of the character above noted which includes means for protecting the cow's udder. The floors of the modern dairy stable are ordinarily of concrete, and when a cow lies down its udder contacts the cold concrete, which in many instances has proven to be an unhealthy condition. In accordance with this invention a rubber pad is detachably supported by the harness immediately beneath the cow's udder, so that when the cow lies down its udder rests on this rubber pad rather than the concrete floor. Particular objects and advantages of the invention are tied up with the manner in which this udder protector is supported by the harness.

Another object of the invention is the provision of a dairy stable which includes means for flushing out pouches which might be carried by cows in the manner aforesaid. More in detail the invention has, as an object, the provision of an arrangement in which a single pouch is worn by the cow at all times that the cow is in its stall. The lower end of this pouch is connected by a flexible conduit with a sewage drain, while provision is made for introducing flushing water into the upper portion of the pouch.

Various other more detailed objects and advantages of the invention such as arise in connection with carrying out these ideas in a practical embodiment will in part become apparent, and in part be hereinafter stated, as the description of the invention proceeds.

The invention, therefore, comprises a sanitary device for dairy cows and which device comprises a harness that is intended to be applied to cows while they are in a dairy stable. Means are provided for supporting the harness extraneously of the cow, and in such a manner as to permit movement of the cow into and out of lying down position. A pouch is detachably secured to the harness and positioned to receive the natural excrement from the cow. An udder protector is also detachably carried by the harness, and in a modified form provision may be made for flushing out the pouch.

For a full and more complete understanding of the invention reference may be had to the following description and accompanying drawings, wherein Figure 1 is a perspective view of a rear portion of a cow to which a sanitary device has been applied in accordance with the precepts of this invention, Figure 2 is a rear view of a modified form, and Figure 3 is a perspective view of a portion of a stable developing the manner in which the flushing arrangements may be embodied therein.

Referring now to the drawings, wherein like reference characters denote corresponding parts, and first more particularly to Figure 1, the sanitary device of this invention is shown in its more simple form as comprising a harness referred to in its entirety by the reference character H, and a pouch identified at P. The rear portion of a cow is represented at C, and the harness H is shown as applied thereover. This harness H comprises a cross pad 10 which may be of leather, rubber or suitable composition, and which is intended to lie across the back of the cow C immediately in front of the rear hip bones. This pad 10 is formed with a grommeted hole at 11 which provides means for anchoring one end of a line 12 thereto.

This line 12 extends forwardly of the stall in which the cow C is positioned, and passes over a pulley represented at 13. This pulley may be mounted at any appropriate point in the stall structure, and the lower end of the line 12 after it passes over the pulley 13 is weighted, as represented at 14. This weight 14 is intended to be such as to apply just sufficient support for the harness H and pouch P carried thereby, and yet not interfere with movement of the cow.

Extending rearwardly from the cross pad 10 are a pair of straps 15 and 16. These straps 16 lie along the top of the cow's hips in the manner brought out in Figures 1 and 2, and their front ends are permanently secured to the cross pad 10 in any preferred manner, such as by the fastening elements represented at 17. These straps 15 and 16 are preferably of some material having non-elastic properties such as leather.

These straps 15 and 16 pass over the rear hips of the cow and extend downwardly a slight distance at which point they are joined to a rear panel member 18. This member 18 may be made from any appropriate material such as an appropriate rubber composition, and is intended to lie close against the rear legs of the cow. This member 18 is formed with a pair of grommeted eyelets 19 adjacent each side edge thereof for a purpose to be hereinafter pointed out.

Secured to each of the cow's rear legs, immediately above the hock thereof, is an anchorage such as the encircling strap shown at 20. Attached to each of the anchorages 20 is an elastic strip 21 that extends from this anchorage 20 up to an end of the cross pad 10, the strap 21 being permanently anchored thereto as represented by the fastening elements 22. The elastic properties of these straps 20 accommodate movement of the cow into and out of lying down position. Extending from the panel 18 at the rear to the straps 21 at each side are side straps 23 which preferably are non-elastic in character.

The pouch P may be made from any appropriate material, although the invention has particularly in mind a rubberized fabric which is turned over at the upper edge to provide a bead 24 in which is positioned a rubber tube. This rubber tube is shown at 25 in Figure 2, and serves to keep the upper end of the pouch P in an open position.

The pouch P has a wall 26 intended to engage against the rear legs of the cow. The upper portion of this wall 26 fits up beneath the panel 18 and carries fastening elements 27 which cooperate with the grommet openings 19 to detachably secure the pouch P in effective position.

It is evident that when a cow first enters its stall the harness H may be applied, and the supporting line 12 attached thereto. A clean pouch P is then attached to the harness H by the detachable connections 27, and this pouch is in position to receive excrement from the cow while it is in the stall. If at any time, such as at the beginning of a milking operation, the attendant notices a filled or soiled condition of the pouch P, it may readily be removed and a fresh pouch substituted.

For the purpose of protecting the cow's udder, a rubber pad shown at 9 is positioned therebeneath. This pad 9 is supported by straps 28 at the front which extend upwardly to the straps 21, the connection thereto being represented at 29. The connection between the lower ends of the straps 28 and rubber pad 9 is preferably of a detachable connection, as represented at 30.

From the rear of the pad 9 there extends upwardly a pair of straps 31 which pass in the rear of pouch P and are connected at their upper ends to the panel 18 above the pouch P. This udder protector 27 will normally be retained in the position illustrated, and if the cow should ever lie down it will be interposed between the concrete floor and the cow's udder. At the time of milking operations it may be removed by availing of the detachable connections at 30 and lower ends of straps 31.

Referring now more particularly to Figures 2 and 3, a modified form of the invention will now be described. In this embodiment the harnesses H which are worn by the cow remain substantially the same as that already described, and the same arrangement is provided for protecting the cow's udder. There is a slight difference in the harness construction, and particularly in the rear panel 18. In this form the upper edge of the panel 18 is turned downwardly to provide a downwardly depending flange 32 that terminates in a roll bead 33 which houses a conduit 34. The conduit 34 and bead 33 are held in non-movable relation and provided with aligned sprinkling openings 35. It will be noted that one end of the conduit 34 is closed, as shown at 36, while provision is made for attaching the other end of the conduit 34 to a flush tank, as represented by the elbow connection at 37. Any appropriate means for establishing the non-movable relation of bead 37 and conduit 34 may be utilized. A suitable adhesive will serve this purpose or the roll bead 33 may be tightly wrapped about the conduit 34 to attain this end.

As shown in Figure 3, the stable will carry, at an appropriate point above the stalls, a flush tank designated F. Extending forwardly from the flush tank F is a rigid pipe 38, and extending downwardly from this pipe 38 is a flexible tube 39 that is connected to the elbow connection 37. A flush valve (not illustrated) is controlled by a chain represented at 40. When occasion arises, an attendant may pull the chain 40 to operate the flush valve and cause water to pass down through the flexible conduit 39 to the conduit 34, from which it emerges through the sprinkling openings 35.

The pouch P of Figure 1 is replaced by a pouch P₁, which is of substantially the same construction so far as the upper portion of the pouch is concerned and the devices for attaching the same to the panel 18. However, the lower portion of the pouch terminates in a flexible conduit 41 that extends down to a sewage drain represented at 42. Thus when the flush valve is opened, as above pointed out, water emerging from the sprinkling openings 35 flush out the pouch P and the contents thereof are carried through the sewer drain 42 to an appropriate disposal point.

While preferred specific embodiments of the invention are hereinbefore set forth it is to be clearly understood that the invention is not to be limited to the exact constructions illustrated and described, because various modifications of these details may be provided in putting the invention into practice within the purview of the appended claims.

I claim:

1. A sanitary device for dairy cows comprising a harness adapted to be fitted over the rear portion of a cow, supplemental means of support for said harness whereby said harness is supported extraneously of said cow, and a pouch carried by said harness in position to receive excrement from said cow.

2. A sanitary device for dairy cows comprising a harness adapted to be fitted over the rear portion of a cow, supplemental means of support for said harness imparting a forward pull to said harness from a support extraneous of the cow, and a pouch carried by said harness in a position to receive excrement from the cow.

3. A sanitary device for dairy cows comprising a harness adapted to be fitted over the rear portion of a cow, supplemental means of support for said harness imparting a forward pull to said harness from a support extraneous of the cow, and a pouch detachably carried by said harness in a position to receive excrement from the cow.

4. A sanitary device for dairy cows comprising a harness and a pouch, said harness consisting of a cross strap adapted to be fitted across the cow's back in front of the hip bones, a rear panel, straps connecting said cross strap to said rear panel, anchorages adapted to be fitted about the cow's rear legs above the hocks thereof, elastic straps connecting said anchorages to said cross strap, and means on said rear panel for detachably securing the said pouch thereto.

5. A sanitary device for dairy cows comprising a harness, a pouch for receiving excrement of a cow, and an udder protector, said harness consisting of a cross strap adapted to be fitted across the cow's back in front of the hip bones, a rear panel, straps connecting said cross strap to said rear panel, anchorages adapted to be fitted about the cow's rear legs above the hocks thereof, elastic straps connecting said anchorages to said cross strap, means on said rear panel for detachably securing the said pouch thereto, and means for supporting said udder protector from said rear panel and said elastic straps.

6. A sanitary device for dairy cows comprising a harness adapted to be fitted over the rear portion of a cow, a pouch carried by said harness in position to receive excrement of the cow and formed with an opening at the bottom, and means for introducing flushing water at the top of said pouch.

7. A sanitary device for dairy cows comprising a harness adapted to be fitted over the rear portion of a cow, a pouch carried by said harness in position to receive excrement of the cow, a flexible conduit connecting the lower end of said pouch to a sewage drain, and means for introducing flushing water into the pouch at the top thereof.

8. A sanitary device for dairy cows comprising a harness adapted to be fitted over the rear portion of a cow, said harness including a rear panel carrying a sprinkling tube, means for connecting said sprinkling tube to a flush tank, a pouch having an open mouth, means for securing said pouch to said panel with said sprinkling tube positioned in said open mouth, and a conduit connecting the lower end of said pouch to a sewage drain.

9. A sanitary device for dairy cows comprising a harness adapted to be fitted over the rear portion of a cow, said harness including a rear panel, a sprinkling tube carried by said rear panel, a flexible conduit for connecting said sprinkling tube to a flush tank, a pouch having an open mouth, means for detachably securing said pouch to said rear panel with said sprinkling tube positioned in said open mouth, and a flexible conduit connecting the lower end of said pouch to a sewage drain.

ALBERT G. BEHRENS.